US009326111B2

(12) United States Patent
Bendi et al.

(10) Patent No.: US 9,326,111 B2
(45) Date of Patent: Apr. 26, 2016

(54) GROUP TEXT MESSAGING TO EMERGENCY SERVICES

(71) Applicant: Verizon Patent and Licensing Inc., Arlington, VA (US)

(72) Inventors: Sethumadhav Bendi, Walnut Creek, CA (US); Lodema M. Steinbach, Clayton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 68 days.

(21) Appl. No.: 14/492,374

(22) Filed: Sep. 22, 2014

(65) Prior Publication Data

US 2016/0088450 A1   Mar. 24, 2016

(51) Int. Cl.
*H04M 11/04* (2006.01)
*H04W 4/14* (2009.01)
*H04W 4/22* (2009.01)

(52) U.S. Cl.
CPC .. *H04W 4/14* (2013.01); *H04W 4/22* (2013.01)

(58) Field of Classification Search
CPC ............................ H04W 4/22; H04W 76/007

USPC ......................................... 455/445, 466, 463
See application file for complete search history.

(56) References Cited

U.S. PATENT DOCUMENTS

| 8,583,076 B2 * | 11/2013 | Foladare | H04M 3/42374 455/404.1 |
| 2014/0244765 A1 * | 8/2014 | Smith | H04L 51/24 709/206 |

* cited by examiner

*Primary Examiner* — Chuck Huynh (57) ABSTRACT

A device may receive, from a user device, a group text message. The device may identify a group of recipients associated with the group text message. The device may determine that the group of recipients includes an emergency services recipient and a non-emergency services recipient. The device may generate an emergency call text message based on the group of recipients including the emergency services recipient and the non-emergency services recipient. The device may send the emergency call text message to the emergency services recipient without sending the emergency call text message to the non-emergency services recipient. The device may send the group text message to the non-emergency services recipient without sending the group text message to the emergency services recipient.

20 Claims, 7 Drawing Sheets

GROUP TEXT MESSAGING TO EMERGENCY SERVICES

BACKGROUND

A communication device, such as a landline telephone, a cellular telephone, a smart phone, a computer device, or the like, may be used to place an emergency call to an emergency services device operated by an emergency services dispatcher. Based on the type of emergency experienced by a user of the communication device, the emergency services dispatcher may send emergency personnel (e.g., fire personnel, medical personnel, police, etc.) to a scene of an emergency situation.

DETAILED DESCRIPTION OF PREFERRED EMBODIMENTS

The following detailed description of example implementations refers to the accompanying drawings. The same reference numbers in different drawings may identify the same or similar elements.

Systems and/or methods described herein may enable a user to communicate with emergency services personnel via a group text message.

A user of a user device, such as, for example, a smart phone, may experience an emergency that requires assistance from emergency personnel. The user may place an emergency call to an emergency services device operated by an emergency services dispatcher, and may relay some details about the nature of the emergency. Based on the nature of the emergency (e.g., whether the emergency is a fire emergency, a medical emergency, a police emergency, etc.), the emergency services dispatcher may send emergency services personnel and/or emergency services equipment (e.g., a fire truck, fire personnel, an ambulance, medical personnel, a police cruiser, a police officer, or the like) to the scene of the emergency.

In some emergencies, the user may not be able to place a voice emergency call (e.g., the user may not desire to make any noise and/or may not be able to speak to the emergency services dispatcher) and/or may desire to alert one or more additional, non-emergency services personnel (e.g., a parent and/or another family member of the user, a friend of the user, or the like). Systems and/or methods described herein may allow the user to place an emergency call by sending a group text message addressed to an emergency services device operated by emergency services personnel (referred to herein as a "emergency services recipient") and to a device associated with a non-emergency services personnel, such as, for example, a friend and/or a family member (referred to herein as a "non-emergency services recipient").

Figure 1:
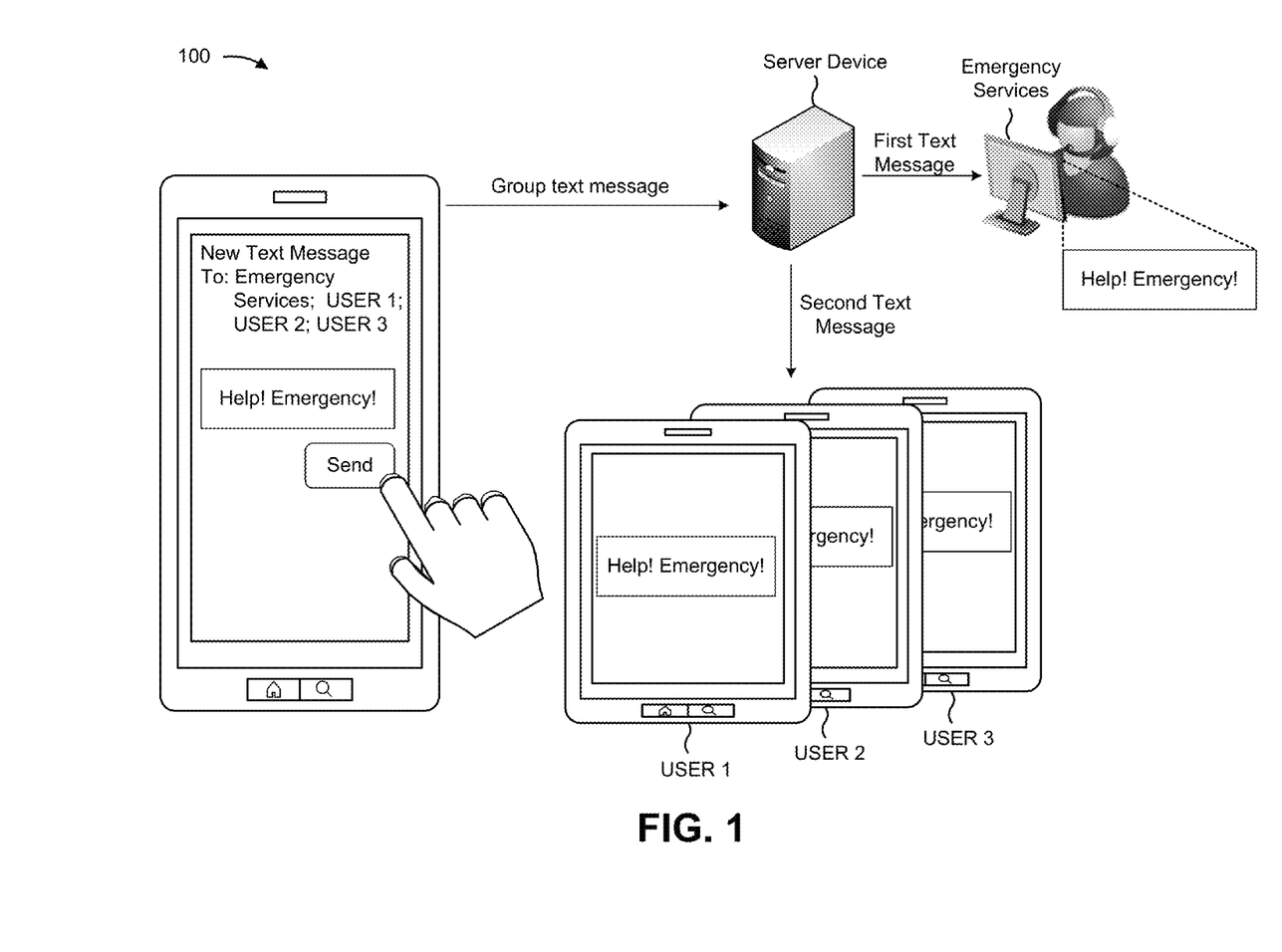
FIG. 1 is a diagram of an overview of an example implementation described herein.

FIG. 1 is a diagram of an example overview 100 of an implementation described herein. For example overview 100, assume that a user witnesses an emergency and desires to notify a group of recipients that includes an emergency services recipient (shown as "Emergency Services" in FIG. 1) and a group of non-emergency services recipients (shown as "USER 1," "USER 2," and "USER 3" in FIG. 1) via a single text message. Further, assume that the user accesses a messaging application executing on a user device (e.g., a cellular telephone, a smart phone, or the like) to compose the text message and that the user inputs address information identifying the group of recipients (e.g., a telephone number) into an address portion of the text message and inputs a message into a body or content portion of the text message. As shown in FIG. 1, the user may select a "SEND" button provided by the messaging application to cause the text message to be transmitted to the group of recipients. The user device may determine that the group of recipients includes two or more recipients and may cause a group text message (e.g., a Multimedia Messaging Service (MMS) message) to be generated and/or sent from the user device.

As further shown in FIG. 1, the group text message may be received by a server device that receives and/or processes group text messages. The server device may analyze the group text message and may determine that the group of recipients includes an emergency services recipient and at least one non-emergency services recipient (e.g., the group of other users). The server device may split, replicate, copy, or otherwise cause two separate messages, a first text message and a second text message, to be formed from the group text message. The first and second text messages may each contain the message input by the user but may have different address information. The address information for the first text message may identify only emergency services and, therefore, may be sent to emergency services and not to the group of other users. The address information for the second text message may identify only the group of other users and, therefore, may be sent to the group of other users and not to emergency services.

By forming the two separate messages from the group text message, the server device may cause a messaging session, established between the user and emergency services, to be separate from a messaging session established between the user and the group of other recipients, thereby allowing emergency services to communicate via text message with the user without receiving messages that may be sent between the user and the group of other users.

Figure 2:
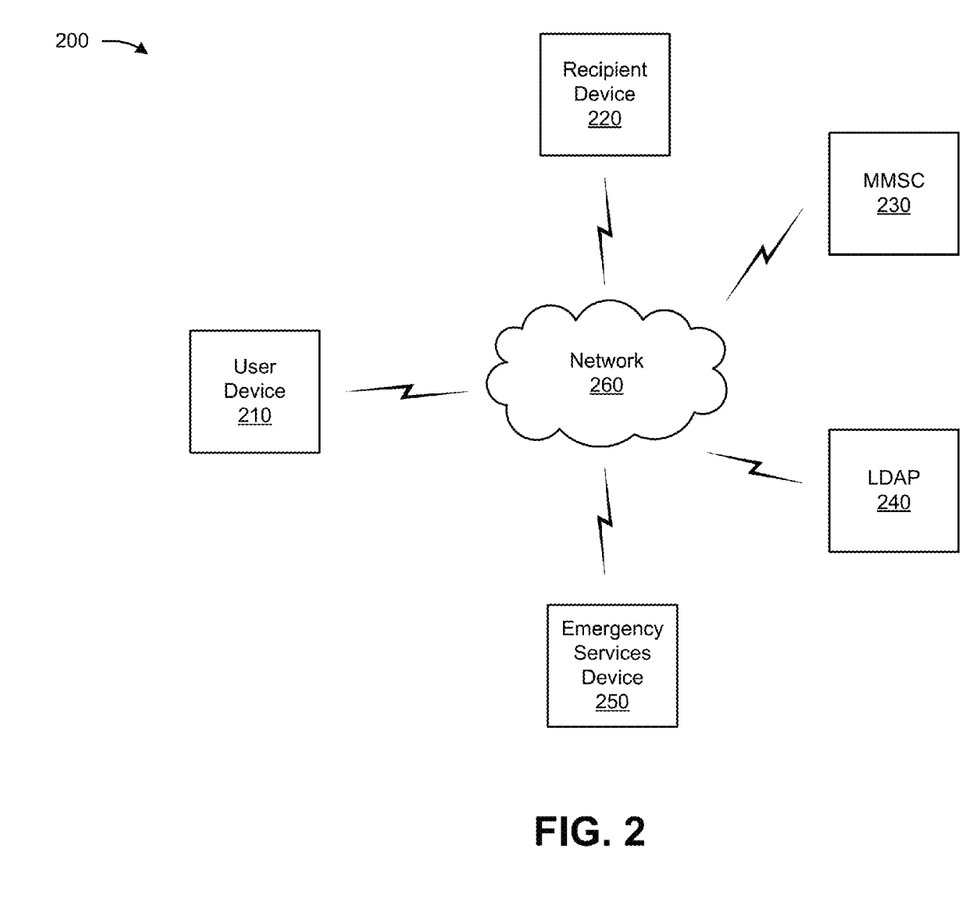
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a recipient device 220, a messaging server device 230, a roaming server device 240, and an emergency services device 250, and a network 260. Devices of environment 200 may interconnect via wired connections, wireless connections, or a combination of wired and wireless connections.

User device 210 may include a device capable of transmitting and/or receiving a group text message. For example, user device 210 may include a mobile telephone (e.g., a smart phone, a radiotelephone, etc.), a computing device (e.g., a desktop computer, a laptop computer, a tablet computer, a handheld computer, etc.), a set top box, or another type of device capable of transmitting and/or receiving a group text message.

Recipient device 220 may include a device capable of transmitting and/or receiving a group text message to/from user device 210. For example, recipient device 220 may include a mobile telephone (e.g., a smart phone, a radiotelephone, etc.), a computing device (e.g., a desktop computer, a laptop computer, a tablet computer, a handheld computer, etc.), a set top box, or another type of device capable of transmitting and/or receiving a group text message to/from user device 210. In some implementations, recipient device 220 may include a same type of device as user device 210. In some implementations, recipient device 220 may include a different type of device as user device 210.

Messaging server device 230 may include a server device or a collection of server devices that store, forward, convert, and/or deliver Multimedia Messaging Service (MMS) messages. For example, messaging server device 230 may include a multimedia messaging service center (MMSC) device that supports MMS connectivity and/or process MMS messages received from user device 210, recipient device 220, and/or emergency services device 250.

Roaming server device 240 may include one or more devices that determine roaming information for user device 210 and/or recipient device 220 and/or provide the roaming information to messaging server device 230. For example, roaming server device 240 may include a lightweight directory access protocol (LDAP) device, a home subscriber server (HSS), and/or another type of device that receives a request for roaming status information from messaging server device 230 regarding user device 210 and/or recipient device 220, determines and/or obtains the requested roaming status information, and/or provides the request roaming status information to messaging server device 230.

Emergency services device 250 may include a device capable of receiving and/or returning emergency calls via a text message. For example, emergency services device 250 may include a mobile telephone (e.g., a smart phone, a radiotelephone, etc.), a computing device (e.g., a desktop computer, a laptop computer, a tablet computer, handheld computer, etc.), a collection of communication devices (e.g., a call center), a public safety answering point (PSAP), or a similar device. Emergency services device 250 may be associated with an emergency call center, an office of emergency services personnel, or the like.

Network 260 may include one or more wired and/or wireless networks. For example, network 260 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a cloud computing network, or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
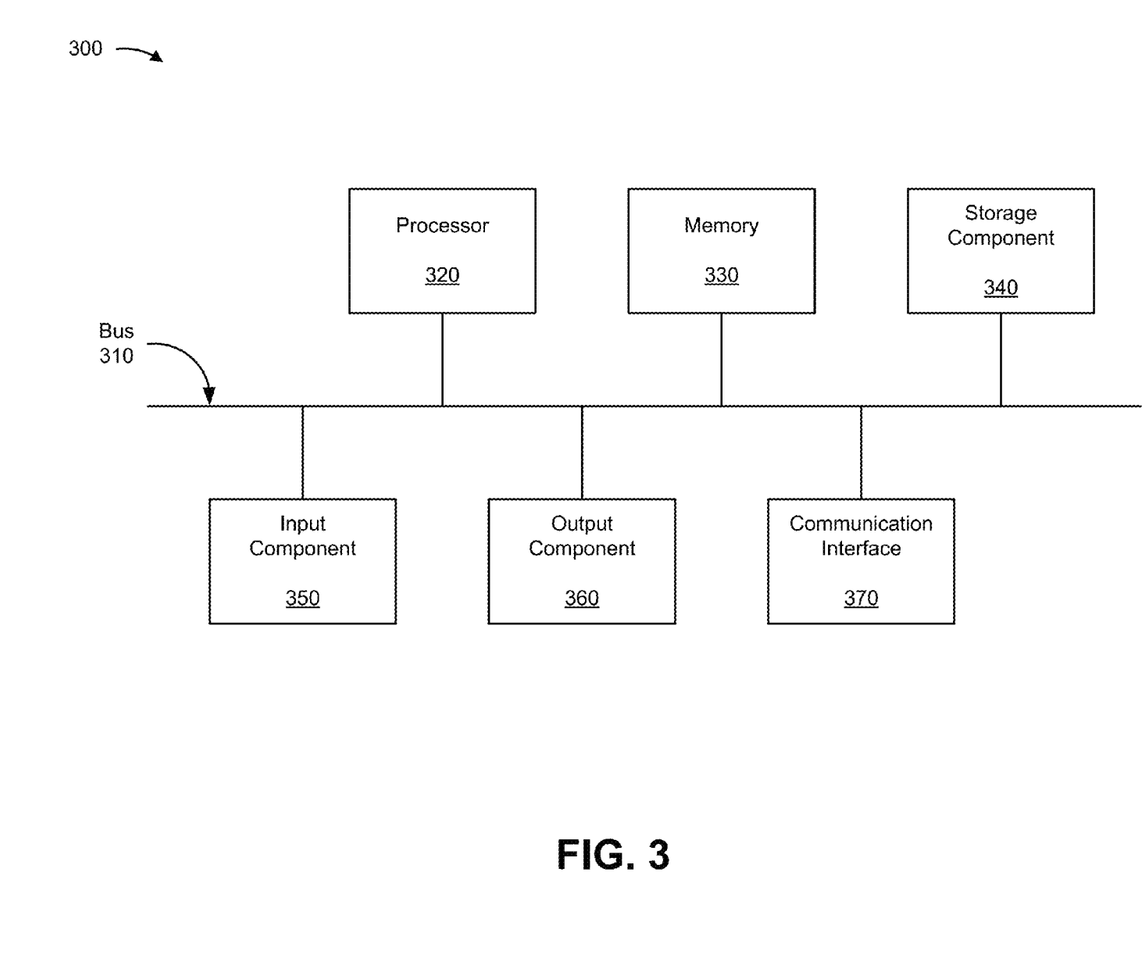
FIG. 3 is a diagram of example components of one or more devices of FIG. 2.

FIG. 3 is a diagram of example components of a device 300. Device 300 may correspond to user device 210, recipient device 220, messaging server device 230, roaming server device 240, and/or emergency services device 250. In some implementations, user device 210, recipient device 220, messaging server device 230, roaming server device 240, and/or emergency services device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
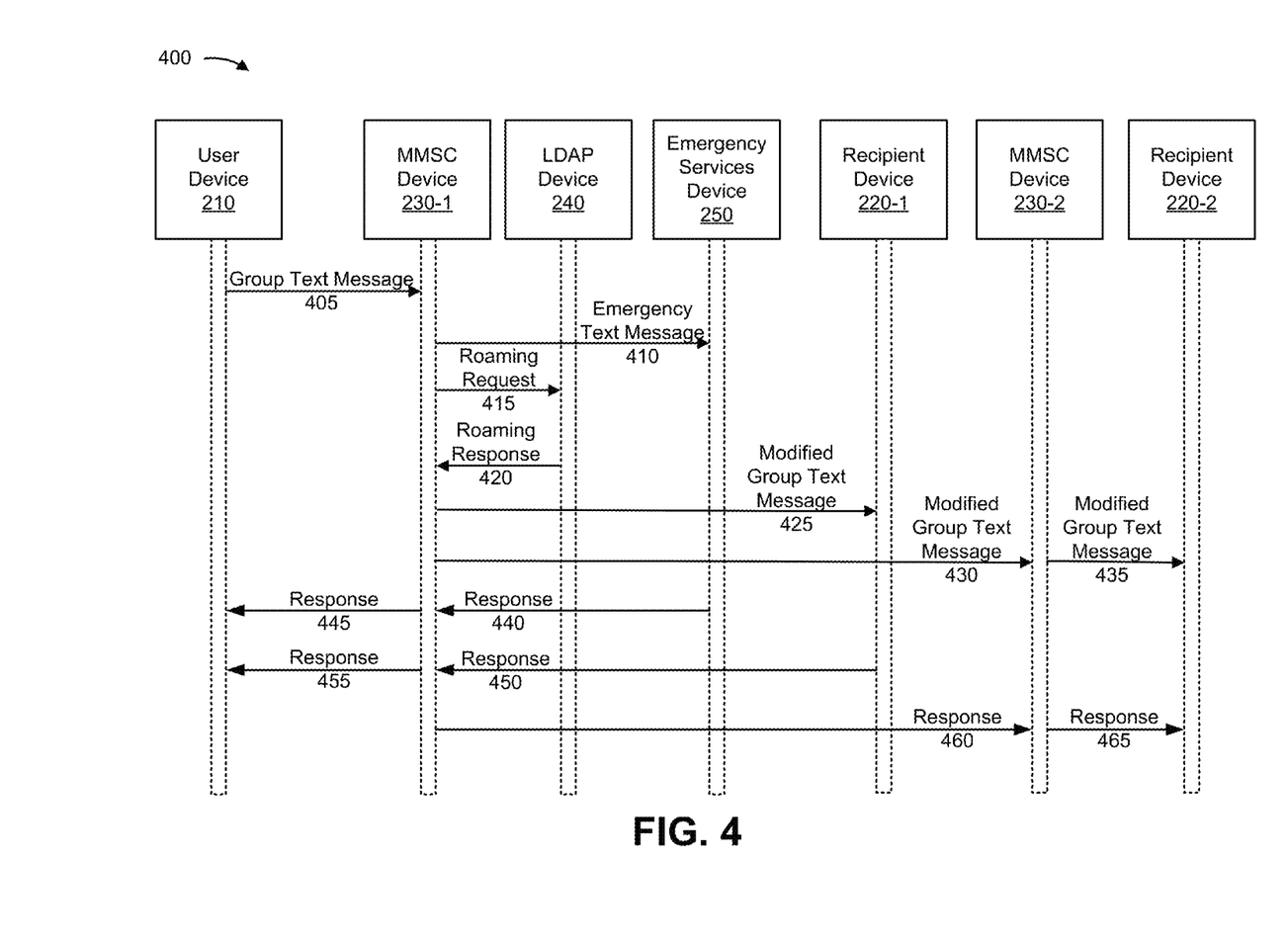
FIG. 4 illustrates a call flow diagram of an example operation capable of being performed by an example portion of the environment of FIG. 2.

FIG. 4 illustrates a call flow diagram of example operations capable of being performed by an example portion 400 of environment 200. As shown in FIG. 4, portion 400 may include user device 210, recipient device 220-1, recipient device 220-2, messaging server device 230-1, messaging server device 230-2, roaming server device 240, and emergency services device 250. User device 210, recipient device 220-1, recipient device 220-2, messaging server device 230-1, messaging server device 230-2, roaming server device 240, and emergency services device 250 may include components and/or perform functions described above in connection with, for example, one or more of FIGS. 1-3. FIG. 4 may correspond to example operations for processing a group text message intended for a group of recipients that includes an emergency services device (e.g., emergency services device 250).

For FIG. 4, assume that a user causes user device 210 to transmit a group text message to a group of recipients and that the group includes a first user associated with recipient device 220-1, a second user associated with user device 220-2, and an operator associated with emergency services device 250. Further, assume that user device 210, recipient device 220-1, and messaging server device 230-1 are associated with a first service provider and that recipient device 220-2 and messaging server device 230-2 are associated with a second, different service provider.

As shown in FIG. 4, user device 210 may transmit group text message to messaging server device 230-1 (as identified by reference number 405). Messaging server device 230-1 may receive the group text message and may send an emergency call text message (as identified by reference number 410) to emergency services device 250. In some implementations, messaging server device 230-1 may send the emergency call text message to emergency services device 250 via a text control center device and/or a peering network that provides text messaging services for emergency services device 250.

In some implementations, messaging server device 230-1 may generate the emergency call text message based on the group of recipients including at least one non-emergency services device. For example, messaging server device 230-1 may parse a header portion of the group text message to identify the group of recipients to which the group text message is to be sent. Messaging server device 230-1 may determine that the group of recipients includes emergency services device 250 and at least one non-emergency services device (e.g., recipient device 220-1 and recipient device 220-2). Messaging server device 230 may generate the emergency call text message based on the group of recipients including emergency services device 250 and the at least one non-emergency services device.

In some implementations, the emergency call text message may be a copy of the group text message. For example, messaging server device 230-1 may generate the emergency call text message by replicating, or forming a copy of, the group text message and/or removing each non-emergency service recipient (e.g., recipient device 220-1 and recipient device 220-2) from the group of recipients.

As further shown in FIG. 4, messaging server device 230-1 may send a request for roaming information regarding recipient device 220-1 and recipient device 220-2 to roaming server device 240 (as identified by reference number 415). Roaming server device 240 may obtain the requested roaming information and may send the roaming information to messaging server device 230-1 via a response (as identified by reference number 420). The roaming information may indicate that recipient device 220-1 is associated with the first service provider and/or that recipient device 220-2 is associated with the second service provider.

Messaging server device 230-1 may remove emergency services device 250 from the group of recipients to form a modified group text message. In some implementations, messaging server device 230-1 may include information indicating that the emergency call text message has been sent to emergency services device 250 into the modified group text message. For example, messaging server device 230-1 may include information indicating the group of recipients, to which the group text message was addressed, and/or a copy of the emergency call text message into the modified group text message. By sending the information indicating that the emergency call text message has been sent, a number of messages being sent to emergency services device 250 may be reduced (e.g., the non-emergency recipients will be able to determine that emergency services has been notified of the emergency and will not send a message or otherwise attempt to inform emergency services of the emergency because they are unsure of whether emergency services has been notified).

Messaging server device 230-1 may send the modified group text message to recipient device 220-1 based on recipient device 220-1 being associated with the same service provider serviced by messaging server device 230-1 (as identified by reference number 425). Messaging server device 230-1 may send the modified group text message messaging server device 230-2 based on recipient device 220-2 being associated with the second service provider (as identified by reference number 430). Message messaging device 230-2 may receive the modified group text message and may send the modified group text message to recipient device 220-2 (as identified by reference number 435).

As further shown in FIG. 4, emergency services device 250 may send a response to user device 210 in response to receiving the emergency call text message (as identified by reference number 440). The response may identify user device 210, and may not identify recipient device 220-1 or recipient device 220-2, as an intended recipient based on messaging server device 230-1 sending the emergency call text message only to emergency services device 250. Messaging server device 230-1 may receive the response and may forward the response to user device 210 (as identified by reference number 445).

In some implementations, messaging server device 230-1 may generate a read-only copy of the response (e.g., a copy of the response that prevents a reply to the copy of the response from being generated and/or sent to emergency services device 250). Messaging server device 230-1 may send the read-only copy of the response to one or more of the non-emergency services recipient.

As further shown in FIG. 4, recipient device 220-1 may send a response to user device 210 in response to receiving the modified group text message (as identified by reference number 450). The response may identify user device 210 and recipient device 220-2, and may not identify emergency services device 250, as intended recipients of the response based on messaging server device 230-1 removing emergency services device 250 from the group of recipients. Messaging server device 230 may receive the response and may forward response 470 to user device 210 (as identified by reference number 455) and may send the response to recipient device 220-2 via messaging server device 230-2 (as identified by reference numbers 460 and 465).

While a particular series of operations and/or data flows have been described above with respect to FIG. 4, the order of the operations and/or data flows may be modified in other implementations. Further, non-dependent operations may be performed in parallel. Also, in some implementations, some of the operations and/or data flows may be omitted. For example, messaging server device 230-1 may forward the modified group text message to recipient device 220-1 and/or recipient device 220-2 without sending a roaming status request for roaming status information to roaming server 240 and/or without receiving roaming status information from roaming server 240.

Figure 5:
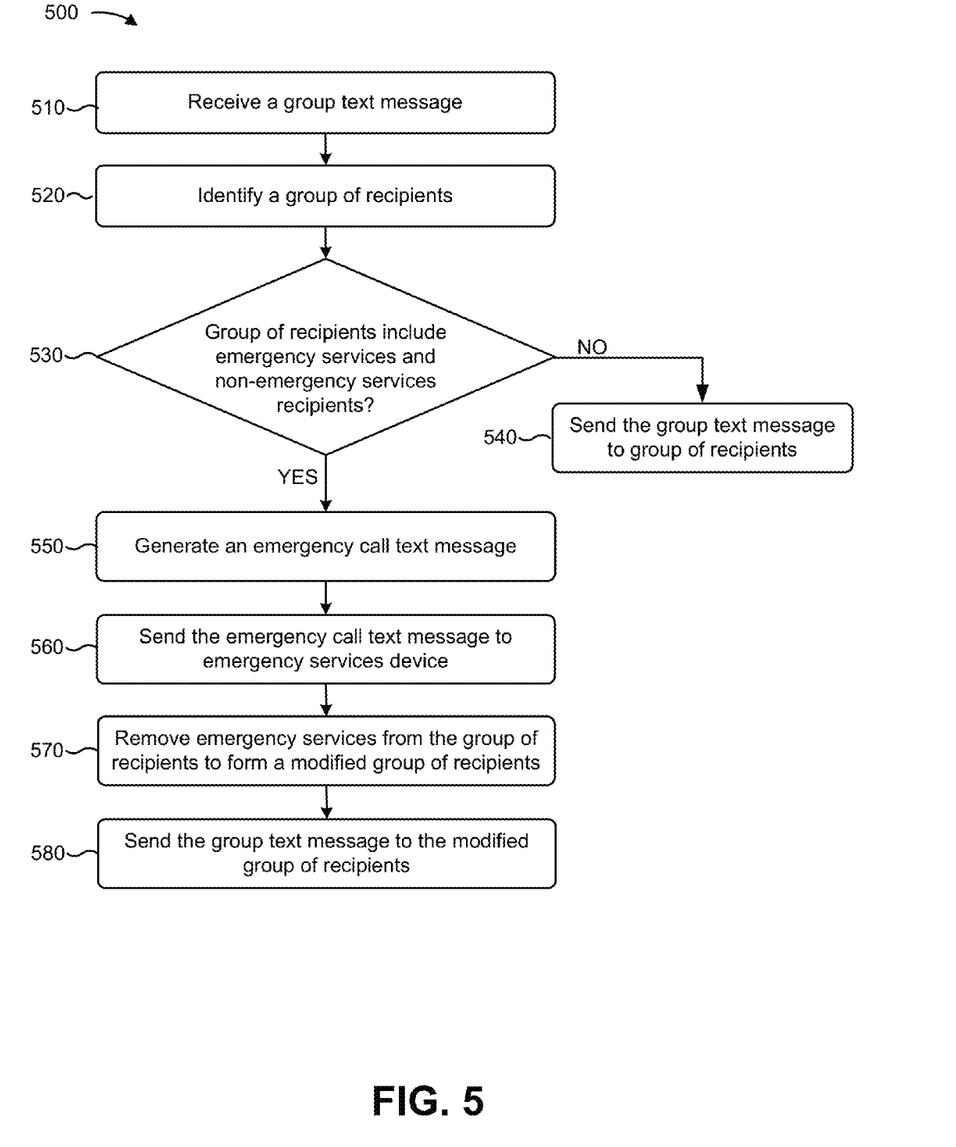
FIG. 5 is a flow chart of an example process for processing a group text message that has an emergency services device and a non-emergency services device as intended recipients of the group text message.

FIG. 5 is a flow chart of an example process 500 for processing a group text message intended for a group of recipients that includes an emergency services device and a non-emergency services device. In some implementations, one or more process blocks of FIG. 5 may be performed by messaging server device 230. Additionally, or alternatively, one or more process blocks of FIG. 5 may be performed by another device or a group of devices separate from or including messaging server device 230, such as user device 210, recipient device 220, roaming server device 240, and/or emergency services device 250.

As shown in FIG. 5, process 500 may include receiving a group text message (block 510). For example, messaging server device 230 may receive a group text message from user device 210. In some implementations, the group text message may be a MMS message. In some implementations, the group text message may be a type of text message different from a MMS message.

As further shown in FIG. 5, process 500 may include identifying a group of recipients (block 520). For example messaging server device 230 may identify a group of recipients to which the group text message is to be sent.

In some implementations, the group of recipients may be identified based on address information included in the group text message. For example, the group text message may include address information that identifies each device (e.g., recipient device 220 and/or emergency services device 250) to which the group text message is to be transmitted. In some implementations, the address information may include a telephone number associated with each recipient included in the group of recipients. Additionally, or alternatively, the address information may include other information (e.g., a mobile device number (MDN), an international mobile subscriber identity (IMSI), an international mobile equipment identity (IMEI), an electronic serial number (ESN), a mobile identification number (MIN), a mobile subscriber integrated services digital network (MSISDN) number, a national access identifier (NAI), a media access control (MAC) address, an Internet Protocol (IP) address, a uniform resource locator (URL), or the like) uniquely identifying a user device. Messaging server device 230 may identify the group of recipients based on the address information included in the group text message.

As further shown in FIG. 5, process 500 may include determining whether the group of recipients includes an emergency services recipient and a non-emergency services recipient (block 530). For example, messaging server device 230 may determine whether the group of recipients includes an emergency services recipient (e.g., emergency services device 250) and a non-emergency services recipient (e.g., recipient device 220).

In some implementations, messaging server device 230 may determine whether the group of recipients includes the emergency services recipient and the non-emergency services recipient based on the address information included in the group text message. For example, messaging server device 230 may determine whether the address information includes a telephone number (e.g., 911) and/or other information associated with emergency services device 250 (e.g., information identifying a text control center (TCC) device associated with providing text messages to emergency services device 250, information identifying a network associated with emergency services device 250, information identifying a network address associated with emergency services device 250, a string of characters indicating that the group text message is intended for emergency services device 250 (e.g., the words "help," "police," "fire," "ambulance," "rescue," "emergency," or the like)), and/or whether the address information includes a telephone number and/or other information associated with recipient device 220.

In some implementations, messaging server device 230 may determine that the group of recipients includes the emergency services recipient and the non-emergency services recipient when the group of recipients identifies emergency services device 250 and recipient device 220. Additionally, or alternatively, messaging server device 230 may determine that the group of recipients does not include the emergency services recipient and the non-emergency services recipient when the group of recipients does not identify emergency services device 250 and/or when the group of recipients does not identify recipient device 220 (e.g., the group of recipients includes a group of emergency services devices 250).

As further shown in FIG. 5, in those instances where the group of recipients does not include the emergency services recipient and the non-emergency services recipient (block 530—NO), process 500 may include sending the group text message to the group of recipients (block 540). For example, messaging server device 230 may determine that the group of recipients does not include the emergency services recipient and the non-emergency services recipient and may send the text message to the group of recipients. In some implementations, the group of recipients may include a group of emergency services devices 250 and messaging server device 230 may send the group text message to the group of emergency server devices 250. In some implementations, the group of recipients may include a group of recipient devices 220 and messaging server device 230 may send the group text message to the group of recipient devices 220.

As further shown in FIG. 5, in those instances where the group of recipients includes the emergency services recipient and the non-emergency services recipient (block 530—YES), process 500 may include generating an emergency call text message (block 550). For example, messaging server device 230 may determine that the group of recipients includes the emergency services recipient and the non-emergency services recipient and may generate an emergency call text message. The emergency call text message may be a separate text message that is formed from the group text message.

In some implementations, when generating the emergency call text message, messaging server device 230 may replicate and/or copy the group text message. For example, messaging server device 230 may copy the group text message to generate the emergency call text message.

In some implementations, when generating the emergency call text message, messaging server device 230 may remove each non-emergency services recipient from the group of recipients. For example, messaging server device 230 may copy the group text message and delete each non-emergency services recipient from the group of recipients from the copy of the group text message to generate the emergency call text message.

In some implementations, when generating the emergency call text message, messaging server device 230 may replicate and/or copy a portion of the group text message. For example, messaging server device 230 may identify a portion of the group text message that includes text corresponding to a message to be conveyed to the group of recipients. Messaging server device 230 may insert the copied portion into the emergency call text message. Messaging server device 230 may obtain information identifying emergency services device 250 as an intended recipient of the emergency call text message (e.g., a telephone number, a network address, or the like) and may insert the information into emergency call text message.

In some implementations, messaging server device 230 may replicate or copy the information identifying emergency services device 250 from the group text message. Additionally, or alternatively, messaging server device 230 may generate the information identifying emergency services device 250 and/or may obtain the information identifying emergency services device 250 from another device.

In some implementations, messaging server device 230 may generate information identifying one or more non-emergency services recipients, included in the group of recipients, and may include the generated information in the emergency call text message. Messaging server device 230 may include the information identifying the one or more non-emergency services recipients in the emergency call text message to provide the emergency services recipient information regarding one or more non-emergency services recipients that have been notified of the emergency.

In some implementations, messaging server device 230 may generate the information identifying the one or more non-emergency services recipients based on identifying a relationship between a user associated with user device 210 and the one or more non-emergency services recipients. For example, messaging server device 230 may determine (e.g., based on a user profile associated with user device 210 and/or the user) that a relationship (e.g., a parent-child relationship, a sibling relationship, a family relationship, a guardian-child relationship, or the like) exists between the user and a particular non-emergency services recipient included in the group of recipients. Messaging server device 230 may generate information identifying the particular non-emergency services recipient, information indicating that the particular non-emergency services recipient was included in the group of recipients, and/or information identifying the relationship between the user and the particular non-emergency services recipient (e.g., information indicating that a child's parents have been notified of an emergency situation associated with the group text message and/or the emergency call text message). By providing the generated information to emergency services device 250, messaging server device 230 may enable emergency services personnel to be better prepared when responding to the emergency. For example, the generated information may enable emergency services personnel to determine that a child is home alone (e.g., based on the child sending a group text message to emergency services device 250 and to a parent(s) of the child), that one or more individuals (e.g., the child's parents) may be traveling to and/or may arrive at a scene of the emergency in a rushed or hurried manner, or the like.

As further shown in FIG. 5, process 500 may include sending the emergency call text message to an emergency services device (block 550). For example, messaging server device 230 may send the emergency call text message to emergency services device 250 without sending the emergency call text message to any other recipient included in the group of recipients. In some implementations, messaging server device 230 may send the emergency call text message to emergency services device 250 as discussed in conjunction with FIG. 4.

As further shown in FIG. 5, process 500 may include removing emergency services from the group of recipients to form a modified group of recipients (block 560) and sending the group text message to the modified group of recipients (block 570). For example, messaging server device 230 may remove emergency services device 250 from the group of recipients to form a modified group of recipients. The modified group of recipients may include only the non-emergency services recipient(s) included in the group of recipients. Messaging server device 230 may send the group text message to the modified group of recipients. In some implementations, messaging server device 230 may send the group text message to the modified group of recipients as discussed in conjunction with FIG. 4.

In some implementations, messaging server device 230 may send a copy of the text message to the modified group of recipients. For example, messaging server device 230 may replicate and/or copy the group text message and may send the copy of the group text message to the modified group of recipients. In some implementations, messaging server device 230 may replicate and/or copy the group of recipients and may remove emergency services device 250 from the copy of the group of recipients to form the modified group of recipients. Additionally, or alternatively, messaging server device 230 may replicate and/or copy the content of the group text message. Messaging server device 230 may generate and/or obtain information associated with the non-emergency services recipient and may include the information associated with the non-emergency services recipient with the copied content to generate the copy of the group text message.

In some implementations, messaging server device 230 may generate information indicating that the emergency call text message has been sent to emergency services device 250 and may include the generated information in the group text message. Messaging server device 230 may include the information indicating that the emergency call text message has been sent to emergency services device 250 to notify the non-emergency services recipients that emergency services personnel have been notified of the emergency.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
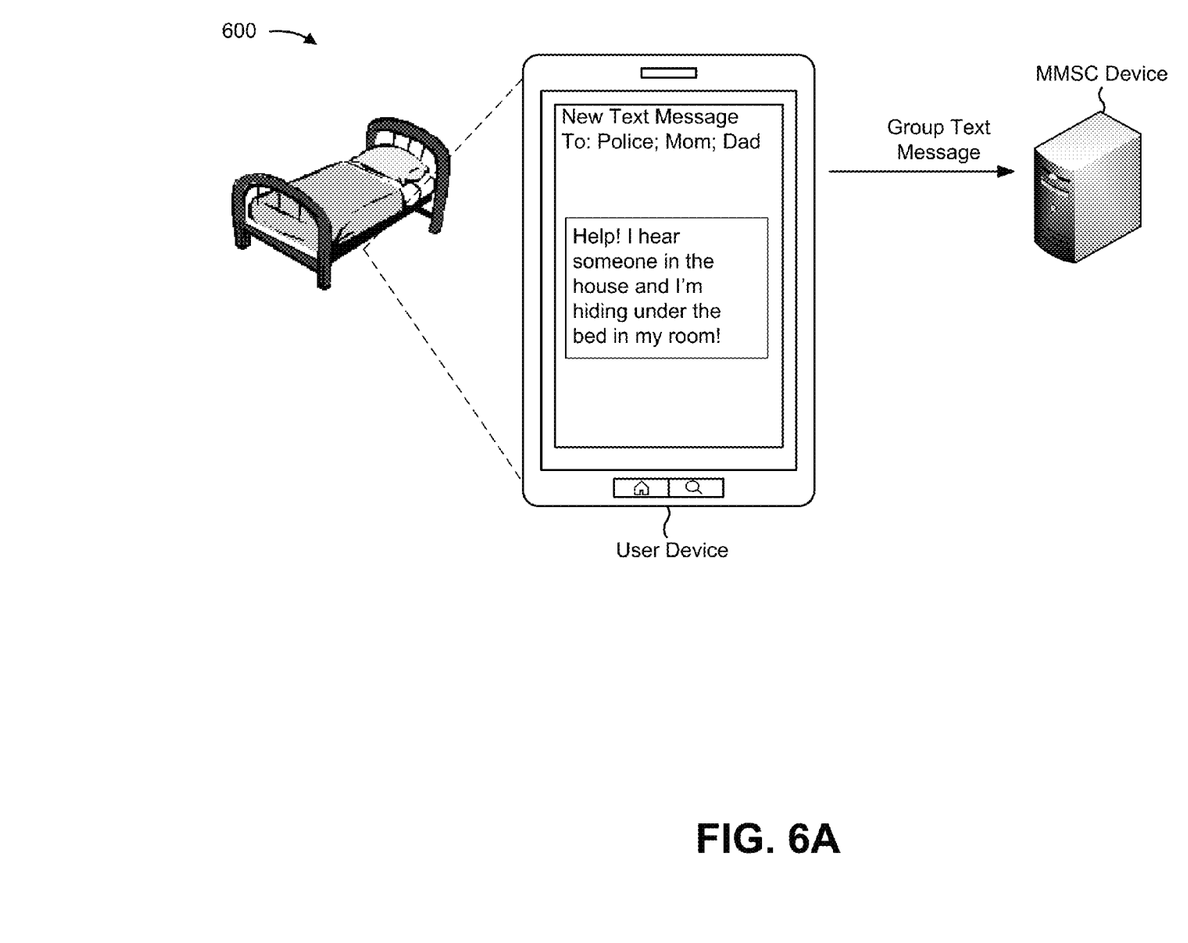
FIGS. 6A and 6B are diagrams of an example implementation relating to the example process shown in FIG. 5.
Figure 6B:
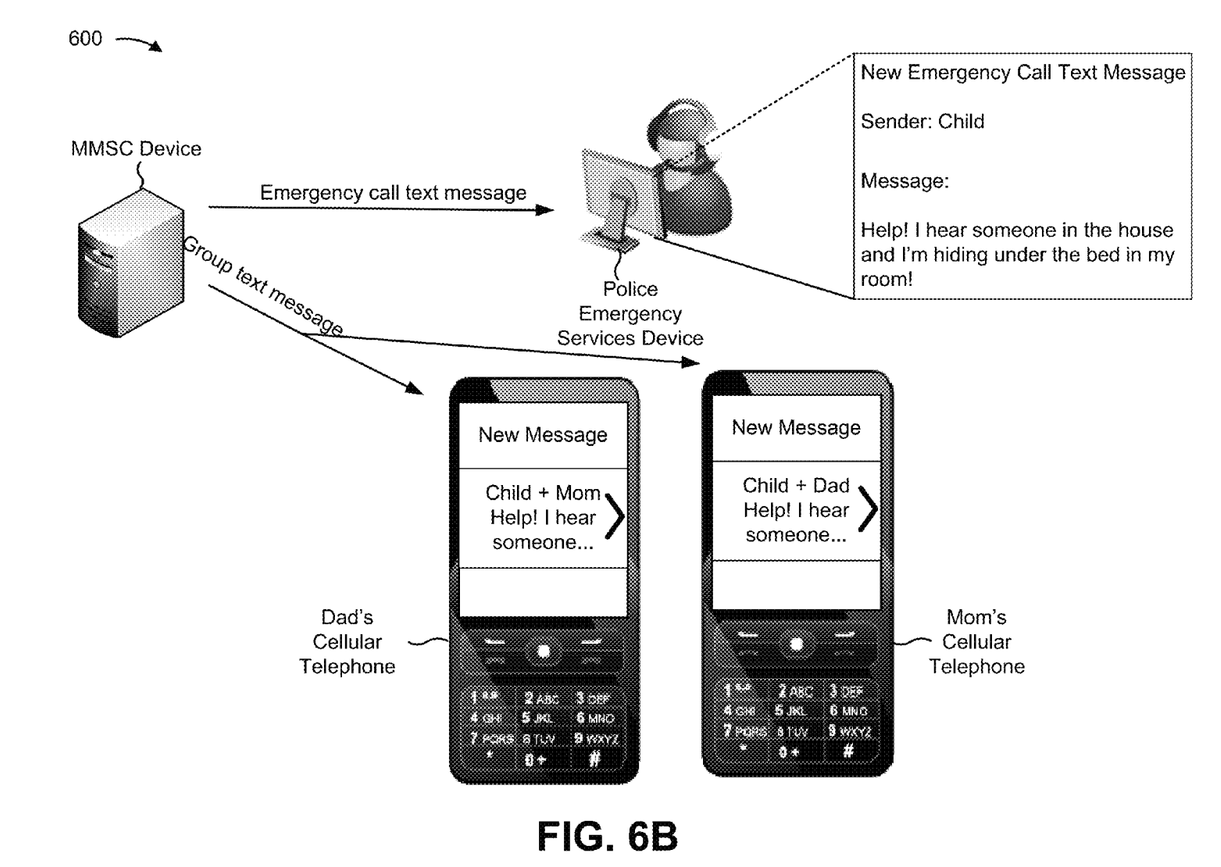

FIGS. 6A and 6B are diagrams of an example implementation 600 relating to example process 500 shown in FIG. 5. FIGS. 6A and 6B show an example of processing a group text message that has an emergency services device and a non-emergency services device as intended recipients of the group text message. For example implementation 600, assume that a child is home alone while the child's parents are out for the evening. Further, assume that the child hears an intruder entering into the child's home and that the child hides under a bed. Assume further that the child desires to notify the child's parents and emergency services (e.g., the police) using a method other than placing a voice telephone call to prevent the intruder from discovering that the child is in the home.

As shown in FIG. 6A, the child may enter a message indicating that the intruder has entered the child's home via messaging application executing on user device 210. The child may input information identifying non-emergency services recipients (e.g., recipient devices 220) (shown as "Mom" and "Dad" in FIG. 6A) and information identifying an emergency services recipient (e.g., emergency services device 250) (shown as "Police" in FIG. 6A). After entering message, the information identifying the non-emergency services recipients, and the information identifying the emergency services recipient, the child may cause the message to be sent to the child's father, mother, and emergency services (e.g., select a "send" button provided by the messaging application). User device 210 may determine that the message is addressed to multiple recipients and may cause a group text message to be sent to messaging server device 230.

Referring now to FIG. 6B, messaging server device 230 may receive the group text message and may identify a group of recipients (e.g., Mom, Dad, and Police) to which the group message is to be sent. Messaging server device 230 may determine that the group of recipients includes an emergency services recipient (e.g., Police) and a non-emergency services recipient (e.g., Mom and/or Dad). Messaging server device 230 may generate an emergency call text message based on the group of recipients including the emergency services recipient and the non-emergency services recipient. The emergency call text message may include the content of the group text message and may include information identifying user device 210 (which can be used to determine a location of user device 210). Messaging server device 230 may send the emergency call text message to the emergency services recipient (shown as "Police Emergency Services Device" in FIG. 6B). Messaging server device 230 may remove the emergency services recipient from the group of recipients and may send the group text message to the non-emergency services recipients (shown as "Dad's Cellular Telephone" and "Mom's Cellular Telephone" in FIG. 6B).

As indicated above, FIGS. 6A and 6B are provided merely as an example. Other examples are possible and may differ from what was described with regard to FIGS. 6A and 6B.

Implementations described herein may allow a user to place an emergency call by sending a group text message addressed to an emergency services recipient and a non-emergency services recipient, thereby allowing the user to use an amount of time, that otherwise would have been spent sending multiple text messages, to attend to the emergency situation. Further, by converting the group text message into two separate messages, emergency services personnel can communicate directly with the user. Extraneous messages sent between the user and the non-emergency services recipients are prevented from being provided to the emergency services recipient, thereby reducing the quantity of messages received and reducing any confusion that may be caused by the extraneous messages.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
one or more processors to:
receive, from a user device, a group text message;
identify a group of recipients associated with the group text message;
determine that the group of recipients includes an emergency services recipient and a non-emergency services recipient;
generate an emergency call text message based on determining that the group of recipients includes the emergency services recipient and the non-emergency services recipient;
send the emergency call text message to the emergency services recipient without sending the emergency call text message to the non-emergency services recipient; and
send the group text message to the non-emergency services recipient without sending the group text message to the emergency services recipient.

2. The device of claim 1, where, when generating the emergency call text message, the one or more processors are to:
generate a copy of the group text message.

3. The device of claim 1, where, when generating the emergency call text message, the one or more processors are to:
copy a content of the group text message,
obtain information identifying the emergency services recipient, and
insert the copy of the content and the obtained information into the emergency call text message.

4. The device of claim 1, where the one or more processors are further to:
receive, from the non-emergency services recipient, a response to the group text message; and
send the response to the user device without sending the response to the emergency services recipient.

5. The device of claim 1, where the one or more processors are further to:
receive, from the emergency services recipient, a response to the emergency call text message; and
send the response to the user device without sending the response to the non-emergency services recipient.

6. The device of claim 1, where, when determining that the group of recipients includes the emergency services recipient and the non-emergency services recipient, the one or more processors are to:
identify address information associated with the group text message, and
determine that the address information includes information identifying an emergency services device associated with the emergency services recipient.

7. The device of claim 1, where, when determining that the group of recipients includes the emergency services recipient and the non-emergency services recipient, the one or more processors are to:
identify address information associated with the group text message, and
determine that the address information includes information identifying a recipient device associated with the non-emergency services recipient.

8. A computer-readable medium storing instructions, the instructions comprising:
one or more instructions that, when executed by one or more processors of a device, cause the one or more processors to:
obtain a text message intended for a group of recipients;
determine that the group of recipients includes an emergency services recipient and a non-emergency services recipient;
generate an emergency call text message based on the group of recipients including the emergency services recipient and the non-emergency services recipient;
send the emergency call text message to the emergency services recipient without sending the emergency call text message to the non-emergency services recipient; and
send the group text message to the non-emergency services recipient without sending the group text message to the emergency services recipient.

9. The computer-readable medium of claim 8, where the one or more instructions to obtain the text message include:
one or more instructions that, when executed by the one or more processors, cause the one or more processors to:
receive a multimedia messaging service message from a user device.

10. The computer-readable medium of claim 8, where the one or more instructions to generate the emergency call text message include:
one or more instructions that, when executed by the one or more processors, cause the one or more processors to:
replicate one or more portions of the text message in the emergency call text message.

11. The computer-readable medium of claim 10, where the one or more instructions to replicate the one or more portions include:
one or more instructions that, when executed by the one or more processors, cause the one or more processors to:
replicate one or more of:
a content of the text message, or
address information associated with the text message.

12. The computer-readable medium of claim 8, where the one or more instructions to determine that the group of recipients includes the emergency services recipient and the non-emergency services recipient include:
one or more instructions that, when executed by the one or more processors, cause the one or more processors to:
determine that the text message includes information identifying one or more of:
a telephone number associated with the emergency services recipient, or
a telephone number associated with the non-emergency services recipient.

13. The computer-readable medium of claim 8, where the device comprises a user device; and
where the one or more instructions to obtain the text message include:
one or more instructions that, when executed by the one or more processors, cause the one or more processors to:
generate the text message based on input received from a user associated with the user device.

14. The computer-readable medium of claim 8, where the instructions further comprise:
one or more instructions that, when executed by the one or more processors, cause the one or more processors to:
receive a response associated with the group text message,
the response being received from the non-emergency services recipient; and send the response to a user device from which the group text message was received, the response not being sent to the emergency services recipient based on the response being received from the non-emergency services recipient.

15. A method comprising:

receiving, by a device and from a user device, a first text message;

identifying, by the device, a group of recipients associated with the first text message;

determining, by the device, that the group of recipients includes an emergency services recipient;

generating, by the device, a second text message, corresponding to the first text message, based on the group of recipients including the emergency services recipients;

sending, by the device, the first text message to a non-emergency services recipient included in the group of recipients; and sending, by the device, the second text message to the emergency services recipient.

16. The method of claim 15, further comprising:

determining that the group of recipients includes the non-emergency services recipient; and where generating the second text message includes:

generating the second text message further based on the group of recipients including the non-emergency services recipient.

17. The method of claim 15, where determining that the group of recipients includes the emergency services recipient includes:

determining that the first text message includes address information identifying the emergency services recipient.

18. The method of claim 15, where generating the second text message includes:

copying address information included in the first text message, the address information including information identifying the emergency services recipient, and using the copied address information as an address for the second text message.

19. The method of claim 15, further comprising:

receiving a response from the emergency services recipient; and sending the response to the user device without sending the response to the non-emergency services recipient.

20. The method of claim 15, further comprising:

receiving a response from the non-emergency services recipient; and sending the response to the user device without sending the response to the emergency services recipient.

* * * * *